United States Patent [19]
Schooler

[11] Patent Number: 6,099,017
[45] Date of Patent: Aug. 8, 2000

[54] TRAILER HITCH QUICK-LOCK

[76] Inventor: Paul T. Schooler, 16285 Erin, Fraser, Mich. 48026

[21] Appl. No.: 09/151,119

[22] Filed: Sep. 10, 1998

[51] Int. Cl.⁷ .................................................. B60D 1/00
[52] U.S. Cl. .............................................................. 280/510
[58] Field of Search ................................ 280/504, 507, 280/508, 510, 495, 514, 461.1; 248/316.5; 24/522–524; 224/282, 536

[56] References Cited

U.S. PATENT DOCUMENTS

| | | | |
|---|---|---|---|
| 2,979,137 | 4/1961 | Hess | 172/272 |
| 3,048,228 | 8/1962 | Hess | 172/272 |
| 3,952,431 | 4/1976 | Gledhill | 37/41 |

*Primary Examiner*—Robert J. Oberleitner
*Assistant Examiner*—C. T. Bartz
*Attorney, Agent, or Firm*—Howard & Howard

[57] ABSTRACT

A pair of embodiments of latch structures for latching a driving vehicle to a towed vehicle include pivoting lock members. The pivoting lock members are simple to utilize, and do not require complex tooling or assembly operation. With the present invention, two vehicles may be quickly and easily connected together without the use of complex tools.

11 Claims, 4 Drawing Sheets

TRAILER HITCH QUICK-LOCK

BACKGROUND OF THE INVENTION

This Application relates to a quick lock for connecting a towing vehicle to a towed vehicle.

In the prior art, a number of different types of connections are utilized to connect a towing vehicle such as a truck or car to a towed vehicle such as a trailer.

In particular, one type of trailer hitch includes a very complex arrangement of linkages that allows relative movement of the trailer and car. This type of connection typically utilizes bars which move into a pair of spaced lock openings on the other of the vehicles. Typically, the bars are formed on the driving vehicle, and the locking structure is formed on the towed vehicle. In the prior art, bolts are turned by a wrench to tighten the locking structure on the bars once the bars have been moved into the opening on the locking structure. While this structure provides a solid connection, it is somewhat cumbersome and time consuming to connect the two.

Other examples of towed vehicles include the vehicles utilized for pulling luggage carts or airplanes at airports. Again, a pair of opposed bars are moved into openings on the other of the vehicles and bolts must then be turned by a wrench to secure the two together.

It would be desirable to devise a simplified method of attaching a towing vehicle to a towed vehicle.

SUMMARY OF THE INVENTION

In a disclosed embodiment of this invention a pair of bars are mounted on one of a towed or towing vehicle. The other of the towed and towing vehicles includes a locking structure including a pair of opposed bases for receiving the bars. The locking structure includes a pivoting lock member including a space to receive and secure the bars. The pivoting lock structure pivots around the bars, and moves away from a rest position such that the bars may move beyond the lock structure. At that point, the pivoting member pivots behind the bar, and the bar moves into the space, such that the pivoting lock member locks the bar. Some secondary locking structure may then be utilized to lock the pivoting locking member at the secured position.

In one preferred embodiment, two opposed pivoting locking members are connected together by a bar. The secondary locking structure may include a pin that is moveable behind the pivoting locking members to secure them. Alternatively, a single threaded member turned by ones fingers may be the secondary locking structure.

In a first embodiment, the pivoting locking member includes a bar receiving space that is initially above the location of the rod, as the rods move with the vehicle the pivoting locking member pivots away from the rods, and the rods moves beyond a forward end of the pivoting locking members. At that point the locking structure can pivot downwardly behind the rod. At that point the secondary locking member may be engaged.

In a second embodiment, the pivoting member includes a space that pivots behind the rod, and actually pivots beneath the rod such that it surrounds the rod for greater than 180°.

The present invention can be utilized in any combination of towed and towed vehicles. In one particular example, the system is utilized on the type of vehicle towed car trailer which incorporates a plurality of linkages to allow relative movement. Other applications including airplane luggage carts, airplanes. Any other towing application, are all within the scope of this invention.

These and other features of the present invention can be best understood from the following specification and drawings, the following of which are a brief description.

DETAILED DESCRIPTION OF THE PREFERRED EMBODIMENT

Figure 1:
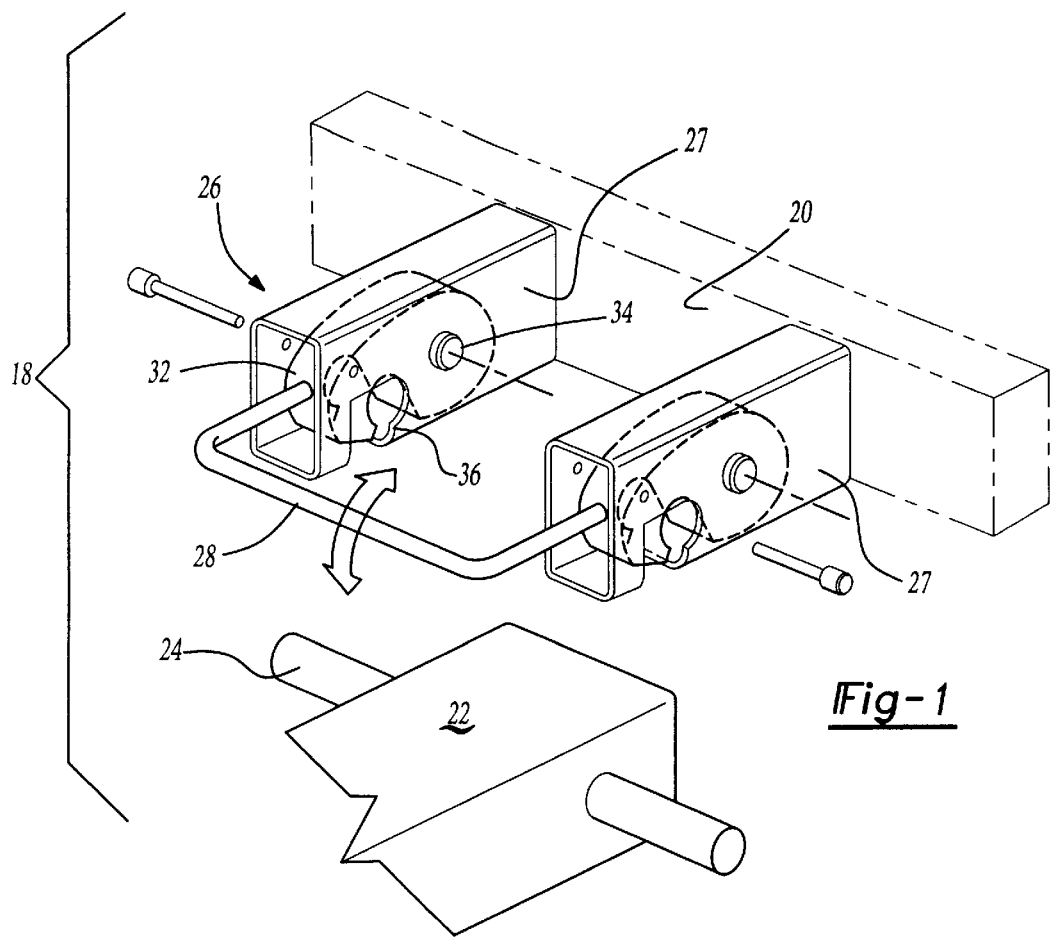
FIG. 1 is a view of a first embodiment of the present invention.

FIG. 1 shows a structure 18 for securing a first vehicle 20 (shown schematically) to a second vehicle 22 (also shown schematically). It should be understood that one of vehicles 20 and 22 is a towing vehicle, and the other is a towed vehicle. Preferably, the towing vehicle includes the rods 24 and the towed vehicle includes the locking structure 26. One example of the vehicles would include a truck or car towing a vehicle trailer through a multi-linkage connection. Other examples include airplane luggage carts, airplanes, etc.

Brackets 27 are formed on the lock structure 26. A linkage 28 connects pivoting locking members 32 which pivot on a pivot axis 34 such that they move in unison. Spaces 30 in the bracket structures 27 receive the pivoting locking members 72.

Figure 2:
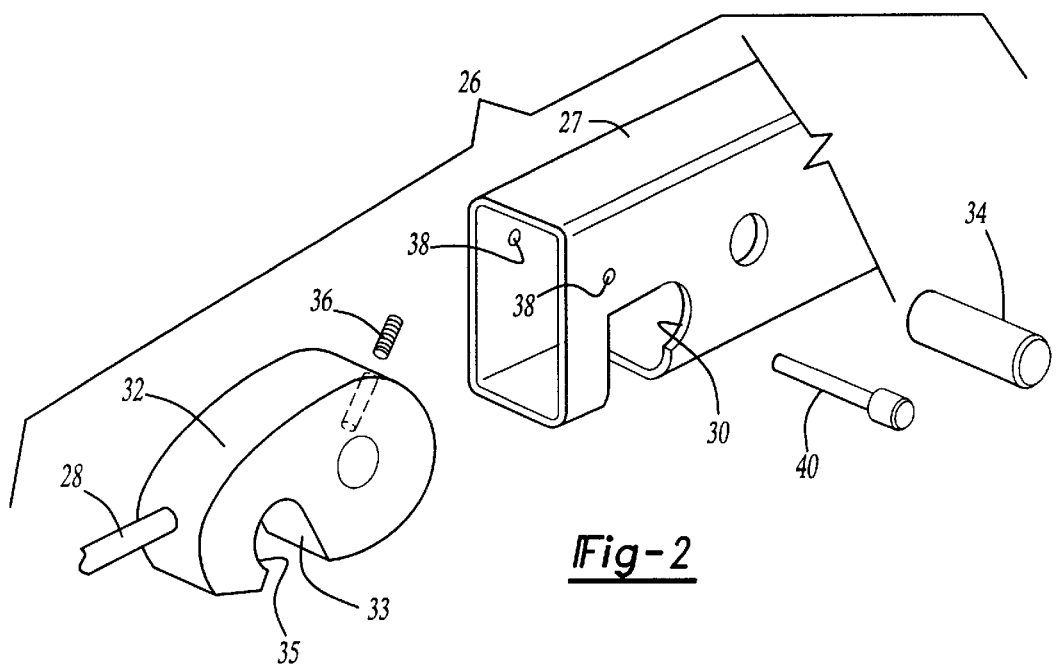
FIG. 2 is an exploded view of the first embodiment.

As can be appreciated from FIG. 2, the pivoting structure includes a space 33 and 35 which will receive the rods 24. A spring 36 biases the bar downwardly to a locking position as will be explained below. A pair of spaced holes 38 receives a secondary lock pin 40 for a purpose to be explained below.

Figure 3:
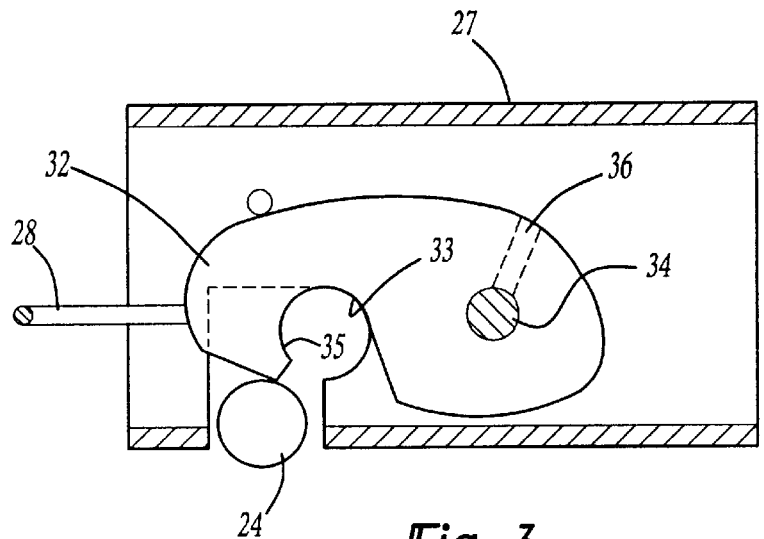
FIG. 3 shows a first step in securing two vehicles together with the first embodiment.
Figure 4:
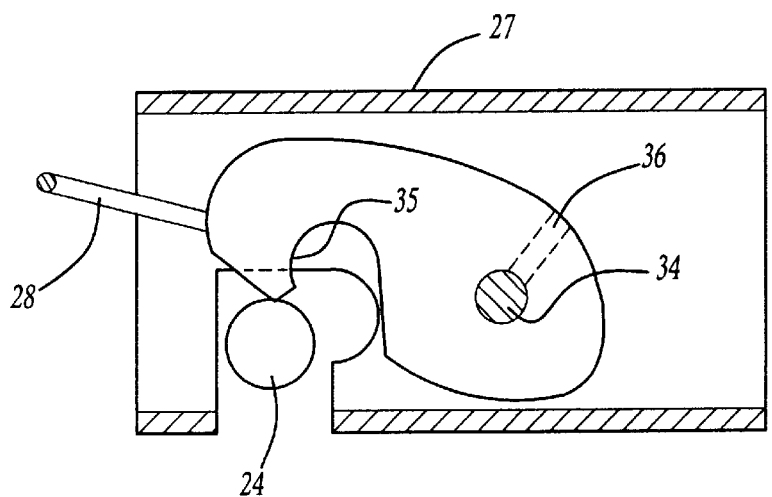
FIG. 4 shows a subsequent step.
Figure 5:
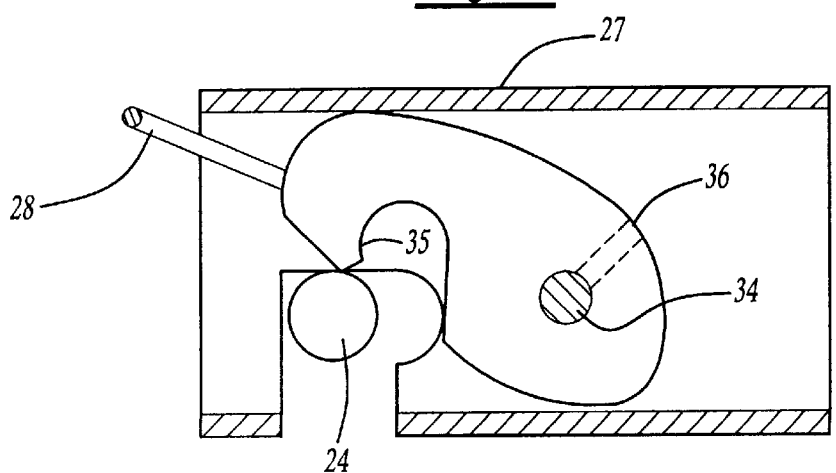
FIG. 5 shows a subsequent step.

When securing a drive vehicle to a towed vehicle, the vehicle 22 is moved rearwardly such that the rods 24 moves along forward end 35 of the pivoting lock member 32. The pivoting lock member 32 pivots upwardly away from the rod 24 such as shown at FIG. 3, and then to the position shown in FIG. 4. As shown in FIG. 5, the pivoting continues, with the spring 36 biasing the structure 32 counterclockwise as shown in these Figures.

Figure 6:
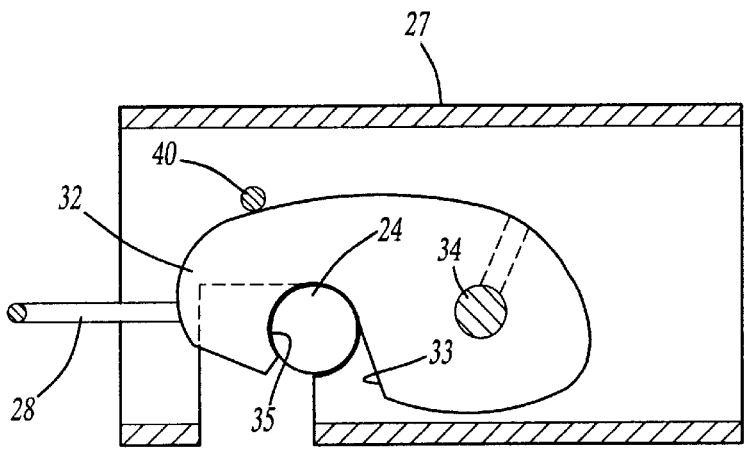
FIG. 6 shows the final secured embodiment.
Figure 7:
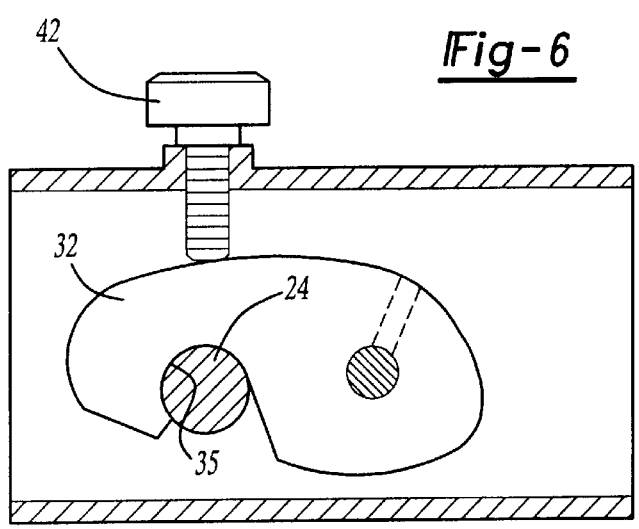
FIG. 7 shows a modification to the FIG. 6 embodiment.

As shown in FIG. 6, once the rod 32 moves beyond the forward lip 35, the spring biases the structure 32 downwardly behind the rod 24 such that the rod 34 is locked within the pivoting locking member 32. At that point, the secondary lock structure 40 may be moved through the openings to secure the locking member at this position. At this position, the two vehicles are connected together such that the driving vehicle may pull the towed vehicle.

FIG. 6 shows a simple modification wherein the secondary lock structure is provided by a simple thumb bolt 42 which may be turned downwardly by hand, to hold the pivoting lock member 32.

Figure 8:
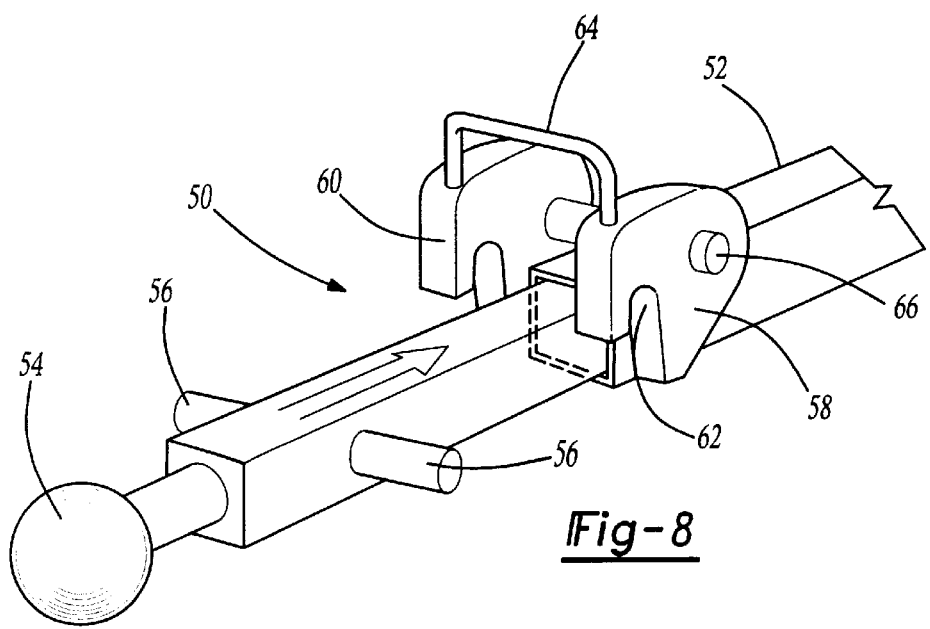
FIG. 8 shows another embodiment.

In a second embodiment 50 shown in FIG. 8, the vehicle 52 receives a ball joint 54 which is connected to the second vehicle. The rods 56 are associated with the second vehicle, and pivoting lock structures 58 secure the rods 56 as will be explained below. The pivoting lock member 60 includes spaces 62 to be received on the rods 56, and a bar 64 connecting the two. The pivot axis 56 mounts the lock members 60 for pivotal movement.

Figure 9:
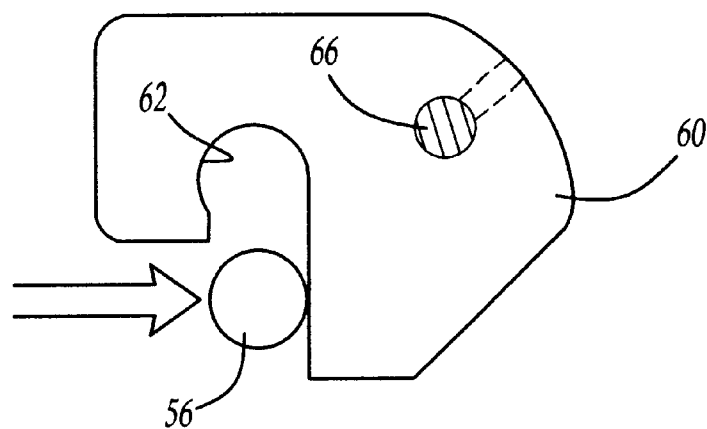
FIG. 9 shows a first step in the securing operation of the FIG. 8 embodiment.
Figure 10:
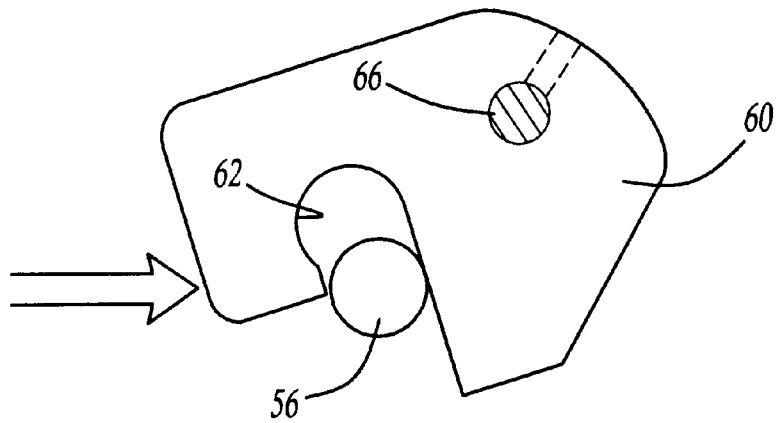
FIG. 10 shows a subsequent step.
Figure 11:
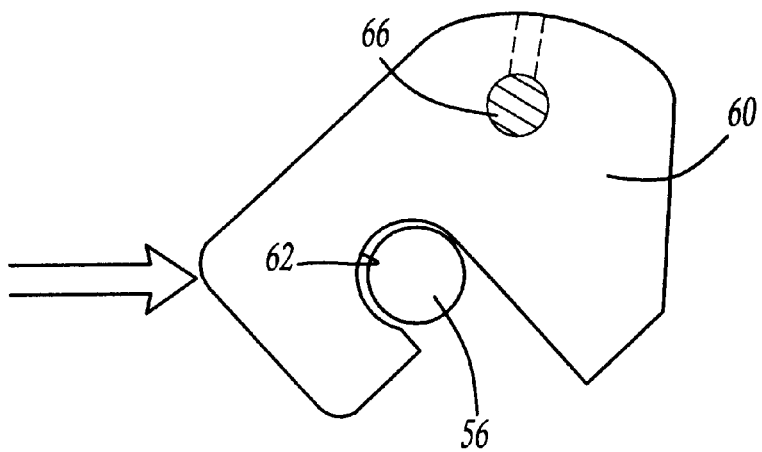
FIG. 11 shows yet another subsequent step.

Again, as shown in FIG. 9, the rod 56 initially hits the pivoting member 60. At that point, the pivoting member begins to pivot about the axis 66. This movement continues as shown in FIG. 10. In this embodiment, the pivoting causes the member to move to a position such as shown in FIG. 11 wherein the opening 62 surrounds the rod 56 for greater than 180°. Again, some secondary locking structure may be utilized. This embodiment is particularly useful for vehicle luggage carts or towing airplanes.

Preferred embodiments of this invention have been disclosed, however, a worker of ordinary skill in the art would recognize that certain modifications come within the scope of this invention. For that reason the following claims should be studied to determine the true scope and content of this invention.

What is claimed is:

1. A structure securing a first vehicle to a second vehicle comprising:

a pair of opposed rods on a first vehicle;

a locking structure on a second vehicle, said lock structure including a pair of opposed pivoting lock members, said pivoting lock members being constructed such that a forward face of said pivoting lock members being contacted by said rods and said pivoting lock members then pivoting to a locked position and said rods contacting said pivoting lock members and causing said pivoting lock members to pivot to said locked position at which prevents movement of said rods outwardly of a space in each of said pivoting lock member;

wherein said spaces in said pivoting lock members includes a forward end and a rear end, and said rods moves past said forward end, with said pivoting lock members then moving to said locked position;

said forward face and said forward end being contiguous.

2. A structure as recited in claim 1, wherein a secondary lock structure locks said pivoting lock member at said locked position.

3. A structure as set forth in claim 1, wherein the movement of said rods to move said locking members to said locked position is generally horizontal.

4. A structure as recited in claim 1, wherein a spring biases said pivoting lock member to said locked position.

5. A structure as recited in claim 1, wherein one of said vehicles is an automobile, and the other of said vehicles is a trailer.

6. A structure as recited in claim 1, wherein one of said vehicles is an airplane luggage cart and the other of said vehicles is a vehicle for towing said airplane luggage cart.

7. A structure as recited in claim 1, wherein one of said vehicles is an airplane and the other of said vehicles is for towing said airplane.

8. A structure as recited in claim 1, wherein a bar connects said two pivoting lock members.

9. A structure securing a first vehicle to a second vehicle comprising:

a pair of opposed rods on a first vehicle;

a locking structure on a second vehicle, said lock structure including a pair of opposed pivoting lock members, said rods contacting said pivoting lock members and causing said pivoting lock members to pivot to a locked position at which it prevents movement of said rods outwardly of a space in each of said pivoting lock member; and said spaces are configured such that said rods first hit a forward face of said pivoting lock members, and drives said pivoting lock members to pivot behind and under said rods;

wherein said spaces in said pivoting lock members includes a forward end and a rear end, and said rods moves past said forward end, with said pivoting lock members then moving to said locked position;

said forward face and said forward end being contiguous.

10. A structure as recited in claim 9, wherein said space surrounds said rods for more than 180°.

11. A structure as set for in claim 9, wherein the movement of said rods to move said locking members to said locked position is generally horizontal.

* * * * *